United States Patent [19]
Nakatani et al.

[11] Patent Number: 5,063,459
[45] Date of Patent: Nov. 5, 1991

[54] FACSIMILE APPARATUS

[75] Inventors: Munehiro Nakatani; Hirokazu Yamada; Masamichi Kishi, all of Osaka, Japan

[73] Assignee: Minolta Camera Co., Ltd., Osaka, Japan

[21] Appl. No.: 482,880

[22] Filed: Feb. 21, 1990

[30] Foreign Application Priority Data

Feb. 23, 1989 [JP] Japan .................................. 1-44705

[51] Int. Cl.⁵ .................................................. H04M 1/00
[52] U.S. Cl. .................................... 358/404; 358/404; 355/285
[58] Field of Search ........................ 358/401, 404, 444; 355/282, 285

[56] References Cited

U.S. PATENT DOCUMENTS 4,540,274  9/1985  Abuyama ............................ 355/285
4,562,485 12/1985  Maeshima .......................... 358/401
4,671,643  6/1987  Shigemura ....................... 355/3 FU
4,905,051  2/1990  Satoh et al. ......................... 355/285
4,951,160  8/1990  Nagahara et al. .................. 358/401

FOREIGN PATENT DOCUMENTS

61-245767 11/1986 Japan .
63-1492   1/1988  Japan .

Primary Examiner—Edward L. Coles, Sr.
Attorney, Agent, or Firm—Willian Brinks Olds Hofer Gilson & Lione

[57] ABSTRACT

A facsimile apparatus comprising a receiver for receiving a data transmitted through a line; image forming device for forming a toner image on a recording paper in accordance with the data; thermal fixing device for fixing the toner image on the recording paper by heating; detecting apparatus for detecting an operating condition of the receiver and outputting a signal in accordance with the receiving condition; and temperature controlling device for controlling an operating condition of the thermal fixing device based on the signal from the detecting apparatus.

20 Claims, 8 Drawing Sheets

FACSIMILE APPARATUS

BACKGROUND OF THE INVENTION

(1) Field of the Invention

The present invention relates to a facsimile apparatus which has an electrophotography processing device including a thermal fixing device in its printing section.

(2) Description of the Related Art

A conventional and widely-used facsimile apparatus has a thermal head for recording an image on a thermosensible paper. Since this type of facsimile apparatus is constructed to turn on the thermal head only during data receiving, power consumption is comparatively small but the thermosensible paper has the problems of being too soft for easy handling and of being difficult for document rewriting by pencil.

In recent years, a facsimile apparatus which can record on a plain paper by use of electrophotography has been used. However, this type of facsimile apparatus has another problem of large power consumption. Usually, a facsimile apparatus should be ready for data receiving 24 hours a day. This means the latter type of facsimile apparatus is required to keep a fixing device comprising a fixing roller or the like at a specified temperature, which results in larger power consumption than that of the former type of apparatus.

SUMMARY OF THE INVENTION

Accordingly, the present invention has an object of offering a facsimile apparatus for forming an image based on a received data on a recording paper by use of electrophotography including thermal fixing, the apparatus being characterized by reducing power consumption and running cost.

The above object is fulfilled by a facsimile apparatus comprising receiving means for receiving a data transmitted through a line; image forming means for forming a toner image on a recording paper in accordance with the data; thermal fixing means for fixing the toner image on the recording paper by heating; detecting means for detecting an operating condition of the receiving means and outputting a signal corresponding to the receiving condition; and temperature controlling means for controlling an operating condition of the thermal fixing means based on the signal from the detecting means.

According to the above, the power consumed during a waiting mode by the thermal fixing means, which would be quite large, is reduced and the operating time of the above means is shortened. Therefore, the total power consumption can remarkably be reduced.

The above object is also fulfilled by a facsimile apparatus for receiving a data transmitted through a line, the apparatus comprising memory means for storing a data transmitted from an addresser; capacity detecting means for detecting an amount of data stored in the memory means; image forming means for forming a toner image on a recording paper in accordance with the data; thermal fixing means for fixing the toner image on the recording paper by heating; and temperature controlling means for controlling the thermal fixing means to have an operating mode temperature which is high enough to fix the image on the recording paper in accordance with a detection result of the capacity detecting means.

The above object is also fulfilled by a facsimile apparatus comprising memory means for storing a data transmitted from an addresser; image forming means for forming a toner image on a recording paper in accordance with the data; thermal fixing means for fixing the toner image on the recording paper by heating; first controlling means for adjusting a temperature of the thermal fixing means; and second controlling means for controlling the first controlling means in accordance with an amount of data stored in the memory means.

According to the above, image forming based on a certain amount of received data is conducted collectively. Therefore, the operating time of the thermal fixing means is further shortened, and thus the power consumption is reduced.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

FIG . 3 is a block diagram of a transmission/receiving system, a reading section and a printing of the same.

DESCRIPTION OF THE PREFERRED EMBODIMENTS

A first embodiment of this invention will be described referring to FIGS. 1 through 5.

A laser facsimile apparatus according to this embodiment comprises a reading section 1 and a printing section 2 disposed on the printing section 1.

Figure 1:
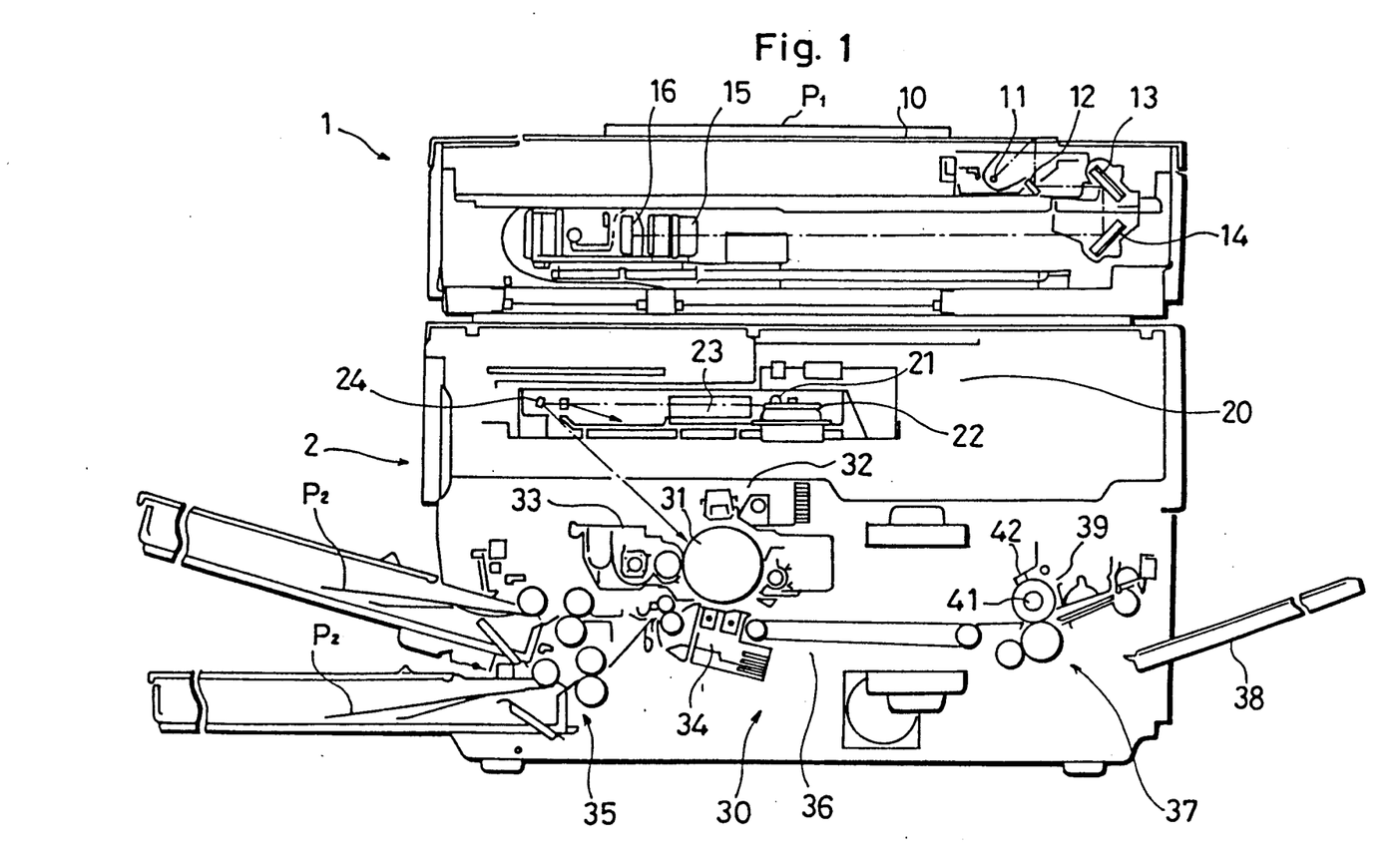
FIG. 1 is a vertical cross sectional view of a facsimile apparatus of a first embodiment according to this invention.
Figure 3:
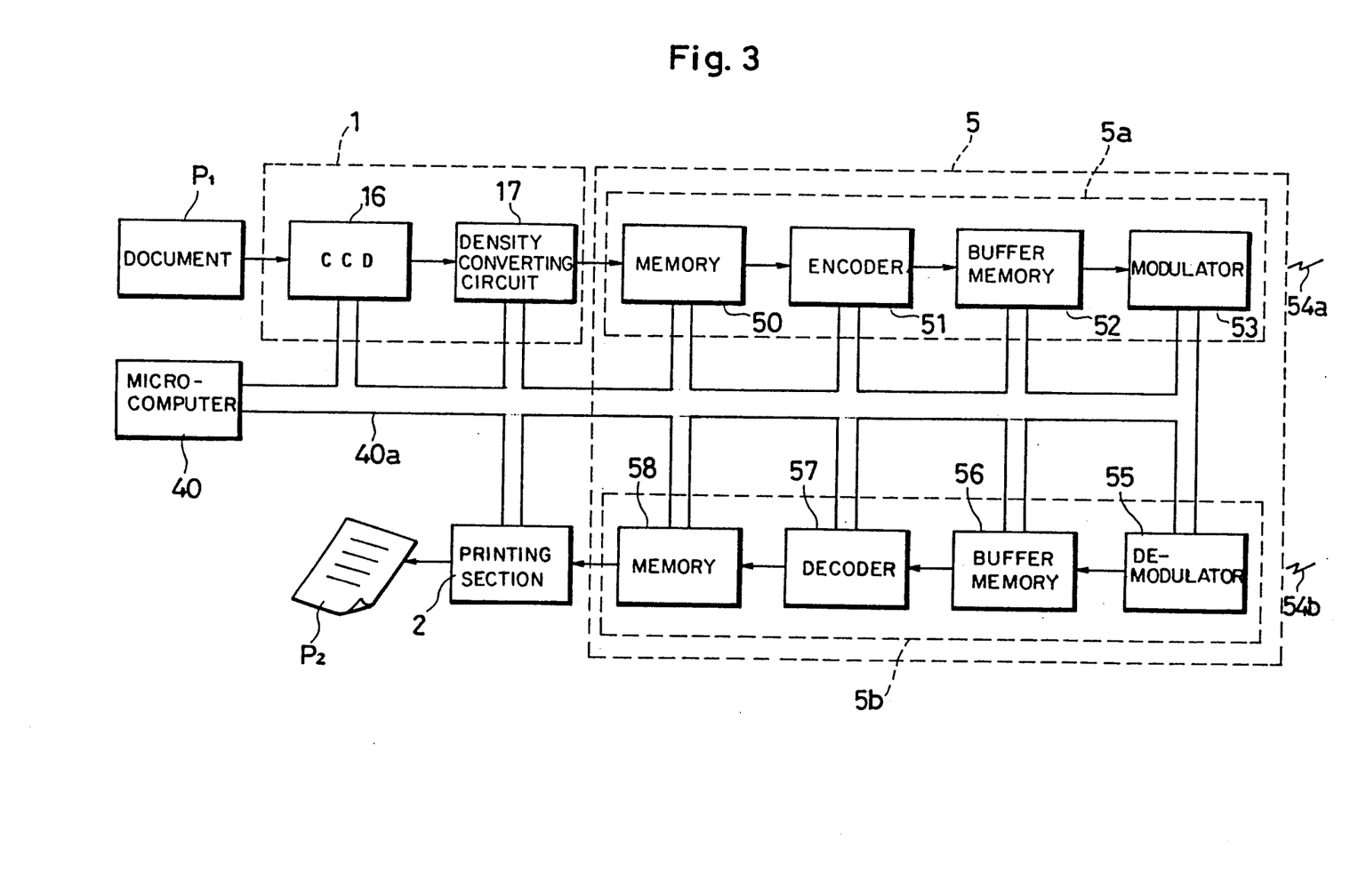

The reading section 1 is constructed as shown in FIG. 1 and is operated in the following way. When a document $P_1$ is set on a glass document table 10 with a surface thereof having an image facing the table 10, an exposure lamp 11 irradiates the document $P_1$ and the light reflected on the document $P_1$ is guided through mirrors 12, 13 and 14 to be focused by a lens 15, whereby the image is projected on a CCD 16. The CCD 16 converts the image into an electric signal and transmits it to another facsimile apparatus on the other terminal of a line 54a (FIG. 3).

The lens 15 is an image reducing optical system for projecting the document image on the CCD 16 with a specified reduction ratio, and the exposure lamp 11 and the mirrors 12, 13 and 14 are movable at the same time to the right and left (FIG. 1) so as to scan the document image.

The printing section 2 comprises a laser head section 20 and a developing and fixing section 30 disposed below the laser head section 20 as shown in FIG. 1 and is operated in the following way. A laser diode 21 receives an electric signal from the facsimile apparatus on the other terminal through a line 54b, converts the electric signal into an optical signal and outputs it as a laser beam. Then, a polygon mirror 22 scans the laser beam, and the scanning light exposes a photoconductive drum 31 through an f-$\theta$ lens 23 and another mirror 24.

Since the drum 31 is already charged by a main charger 32 before exposed, an electrostatic latent image is formed on the drum 31 when the drum 31 is exposed. Then, the drum 31 is supplied with a toner from a developing unit 33 to form a toner image, and the toner image is transferred by a transfer charger 34 onto a paper $P_2$ which is sent from a feeding section 35 at an appropriate timing. The paper $P_2$ having the image transferred thereon is separated from the drum 31, sent to a fixing device 37 by a transport belt 36 to have the image fixed and delivered to a tray 38.

The transmission/receiving operation, which will be described later, is controlled by a microcomputer 40 (FIGS. 2 and 3) through a control signal line 40a.

The fixing device 37 mainly comprises a pair of upper and lower fixing rollers 39, a fixing lamp 41 accommodated inside the upper roller and a thermistor 42 for detecting a temperature of the fixing device 37. (In the embodiments of this specification, the temperature described concerning the fixing device 37 is the temperature of a surface of the upper roller of the fixing device 37.) The fixing device 37 is maintained at a specified waiting mode temperature while waiting for data receiving and while transmission. On detecting data receiving, the microcomputer 40 sets the fixing device 37 at a specified operating mode temperature, which is higher than the waiting mode temperature and also high enough to fix the image. In this way, the image is fixed on the paper $P_2$. A desirable operating mode temperature is approx. 180° C., and a desirable waiting mode temperature is approx. 140° C. The waiting mode temperature is arbitrarily determined depending on the operating mode temperature, conditions of the apparatus or other conditions.

Figure 2:
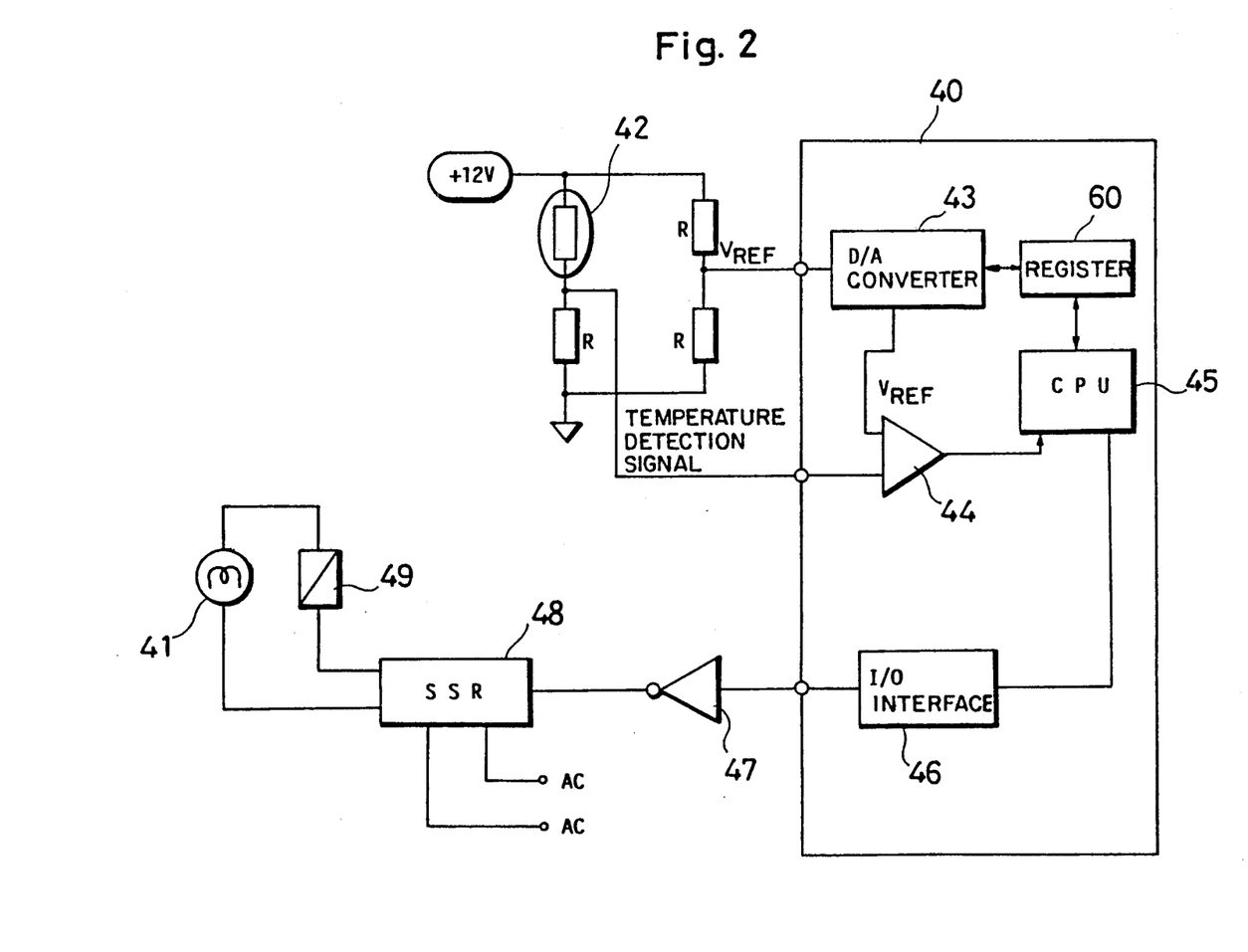
FIG. 2 is a block diagram of a temperature adjusting circuit of a fixing device of the same.

The waiting mode temperature and the operating mode temperature are controlled by a temperature adjusting circuit shown in FIG. 2. A reference voltage $V_{REF}$ obtained by dividing the power voltage 12 V is further divided by a D/A converter in accordance with a value indicated by a register 60 of the microcomputer 40 (namely, a value corresponding to the set temperature of the fixing device 37), whereby a threshold signal $V_{ref}$ is obtained. The threshold signal $V_{ref}$ and a temperature detection signal from the thermistor 42 are compared, and the results are input to a CPU 45. Then, the CPU 45 executes a specified computation. In accordance with the computing results, the CPU 45 sends a specified turning on/off signal to the fixing lamp 41 through an I/O interface 46, an amplifier 47, an SSR (solid state relay) 48 and a thermal fuse 49 in order to switch the set temperature of the fixing device 37 from the waiting mode temperature to the operating mode temperature.

The transmission/receiving system will be described referring to FIG. 3. This system is provided at a specified position in the facsimile apparatus and is electrically connected with the reading section 1 and the printing section 2.

First, a transmission system 5a will be described. The CCD 16 converts the image data optically read from the document $P_1$ to an electric signal and inputs it to a density converting circuit 17. The density converting circuit 17 reads the data with a reading density corresponding with a reference reading density of the apparatus (a bit rate of the image data) and writes it into a memory 50 of the tranmission system 5a.

The memory 50 stores the data corresponding to a one-page image. An encoder 51 compresses the data stored in the memory 50 (encodes the data in order to reduce the data amount) with a specified algorithm and outputs the encoded data to a buffer memory 52. The buffer memory 52, which stores the data corresponding to at least one line of the image, outputs a digital signal as the encoded data to a modulator 53 serially at a specified timing. The modulator 53 modulates the digital signal at a speed corresponding to a specified transmission speed so as to transmit the signal to a facsimile apparatus on the other terminal of the line 54a.

A receiving system 5b will be described hereinafter. When a transmission signal is received from the facsimile apparatus of the other terminal through a line 54b, a demodulator 55 demodulates the signal into a digital signal as an encoded data and writes the encoded data into another buffer memory 56. The buffer memory 56 also stores the data corresponding to one line of the image. A decoder 57 reads the data written into the buffer memory 56 at a specified timing, expands it (decodes the data in order to restore it into its original form), and writes the decoded data into a memory 58. The memory 58 also stores the data corresponding to one page of the image. When the data corresponding to the one-age image is written into the memory 58, the microcomputer 40 switches the set temperature of the fixing device 37 from the waiting mode temperature into the operating mode temperature, whereby the printing section 2 is operated. Then, the printing section 2 sends a transfer command to the memory 58, thereafter the image data is output from the memory 58 to the printing section 2 page by page, and then the printing section 2 forms an image page by page in accordance with the image data.

In the laser facsimile apparatus of this embodiment, the memory 58 is required to have large enough a capacity to store a one-page image data and to output a one-page image after the data of that amount is stored.

Practical transmission/receiving processing will be described referring to FIGS. 4A, 4B and 5.

Figure 4A:
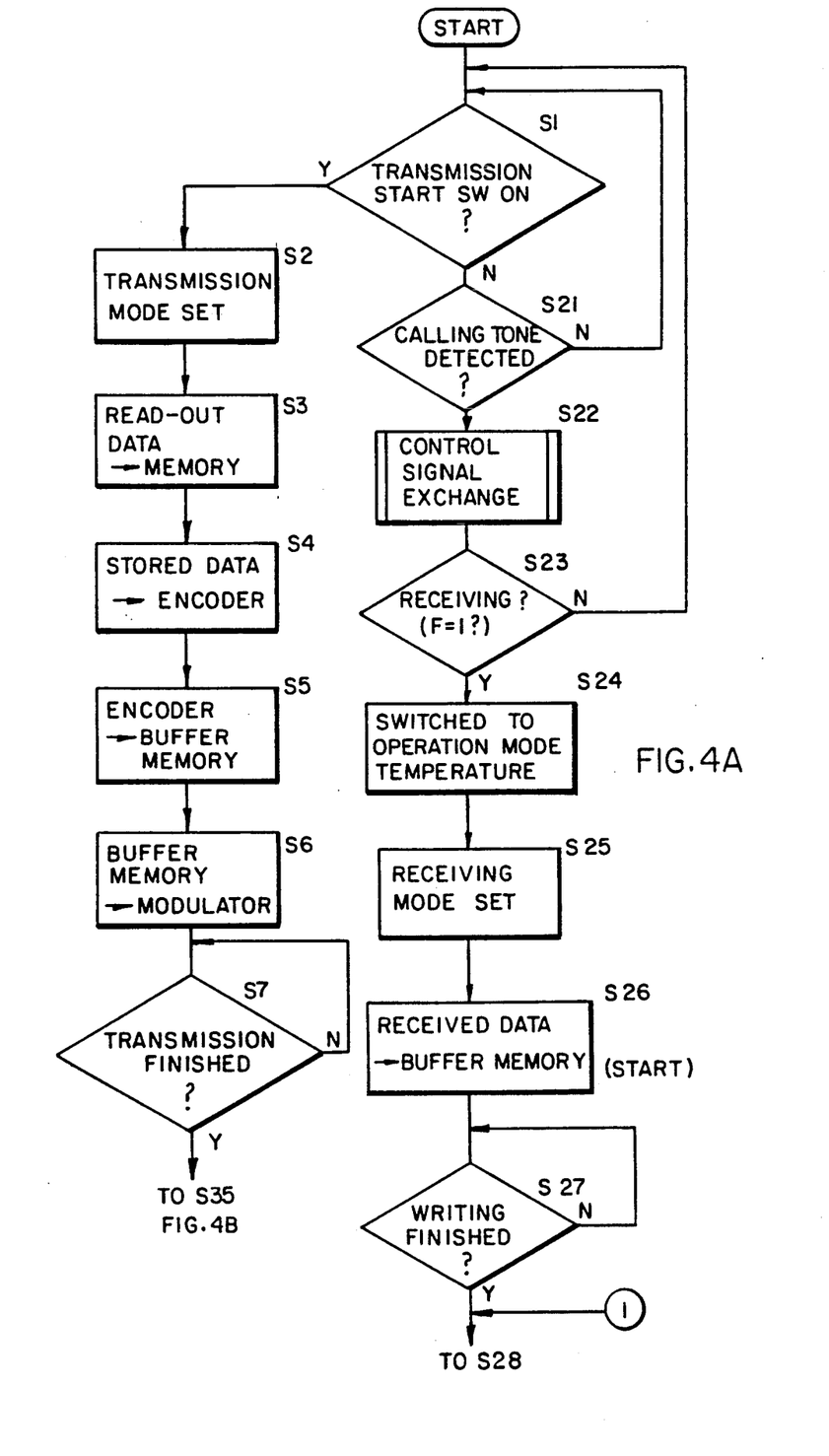
FIGS. 4A–B are flowcharts showing a main routine of the same.
Figure 4B:
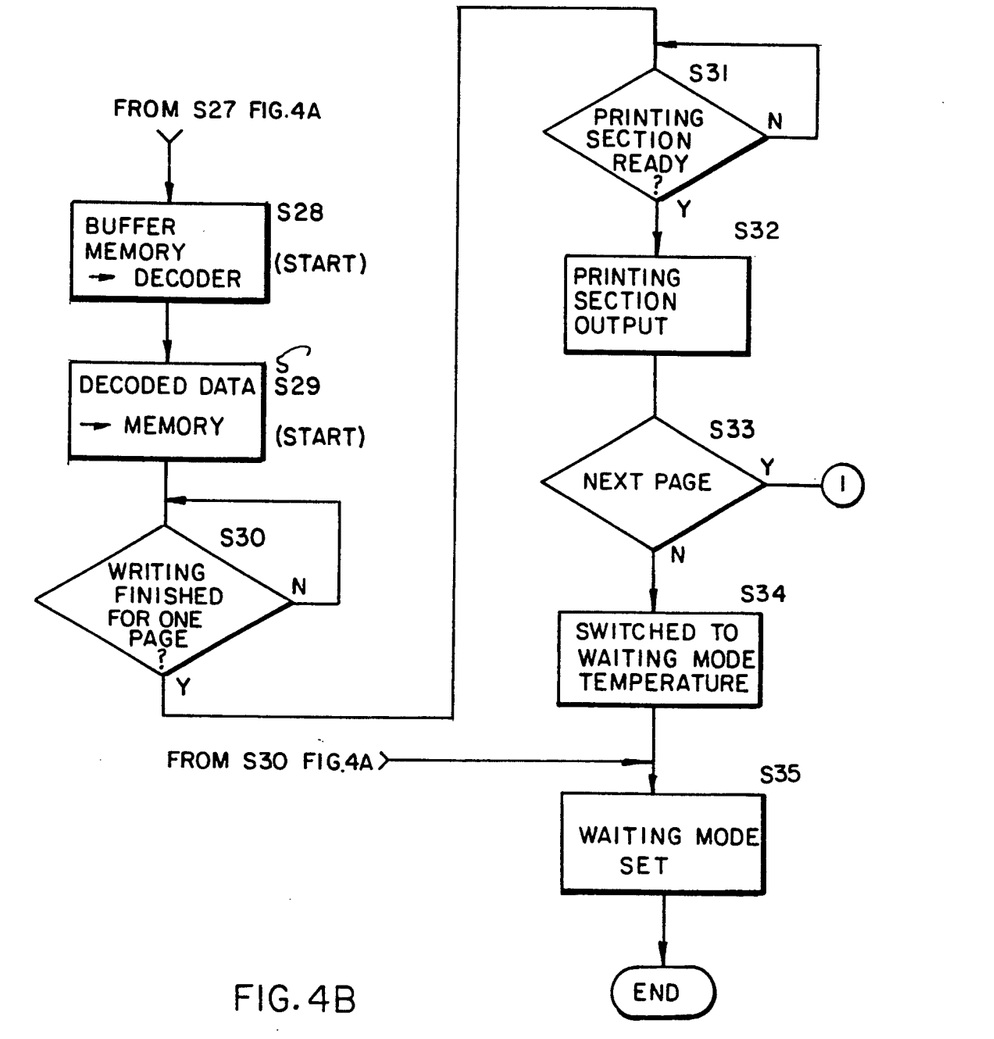

FIGS. 4A and 4B show a main routine. When a control program stored in a ROM built in the microcomputer 40 is started, the microcomputer 40 puts the apparatus into the waiting mode by initialization processing (not shown) and also controls the temperature adjusting circuit to set the temperature of the fixing device 37 at the waiting mode temperature. Then, the microcomputer 40 judges whether a transmission start switch on a control panel (not shown) is turned on or not (S1), and if so, puts the apparatus into a transmission mode (S2). When the document is set (the document may be set before the transmission start switch is turned on), the reading section 1 starts reading the image as described before. The image data is read and written into the memory 50 by the CCD 16 (S3), is output to the encoder 51 (S4), to the buffer memory 52 by the encoder 51 (S5), and to the modulator 53 in sequence and is transmitted to the facsimile apparatus on the other terminal through the line 54a (S6). Whether the transmission is finished or not is judged (S7), and if so, the apparatus is put into the waiting mode (S35), whereby the transmission operation is completed.

If the transmission start switch is not turned on in S1, whether a calling tone is detected or not is judged (S21). If so, control signals are exchanged (S22).

Figure 5:
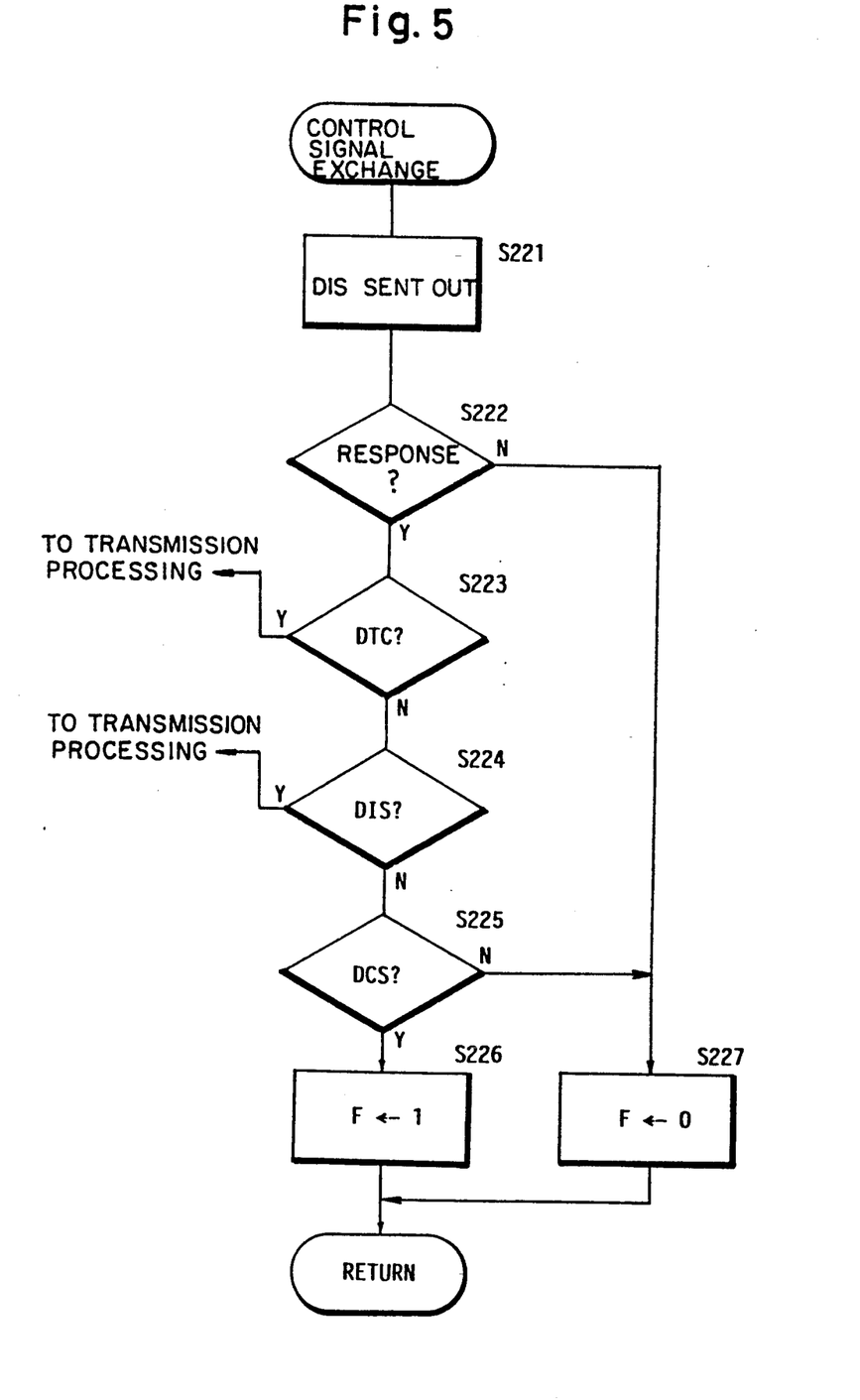
FIG. 5 is a flowchart showing a subroutine of control signal of the same.

The control signal exchange is described in detail in FIG. 5. A DIS (digital identification signal) and other signals are sent to the facsimile apparatus on the other terminal (addresser in this case), whereby all information on the apparatus according to this embodiment (addressee) including a facsimile group number to which it belongs (for example, GII or GIII), its functions concerning transmission/receiving and its conditions at this time (for example, paper size) is given to the addresser (S221). Whether any response is sent from the addresser or not is judged (S222), and if so, whether a DTC (digital transmit command) has been sent from the addresser or not is judged (S223). If so, the addresser is to receive the image data. If the DTC has not been sent from the addresser, whether a DIS has been sent from the addresser or not is judged (S224). Even if the DTC has not been sent but the DIS has, the addresser is to receive the image data. In other words, if a DTC or DIS has been sent from the addresser, the transmission operation is executed. If a DIS has not been sent from the addresser in S224, whether a DCS (digital command signal) has been sent from the addresser or not is judged (S225). (The DCS designates the functions concerning transmission/receiving selected by the addresser among the functions informed by the DIS in S221.) On confirming the DCS has been sent in S225, a receiving flag is set (F=1) for indicating normal receiving is possible and the operation returns to the main routine. If there is no response from the addresser in S222 or the DCS has not been sent in S225, the flag is reset (F=0) and the operation returns to the main routine.

When the operation returns to the main routine, whether the receiving operation is to be executed or not is judged depending on the status of the flag (S23). If F=1, the operation goes to S24, where the temperature adjusting circuit is controlled to switch the set temperature of the fixing device 37 from the waiting mode temperature to the operating mode temperature. Then, the apparatus is put into a receiving mode (S25), and demodulation and writing of the data by the demodulator 55 is started (S26). Whether writing of the data corresponding to one line of the image is finished or not is judged (S27), and if so, reading and decoding of the data by the decoder 57 is started (S28) and writing of the decoded data into the memory 58 is started (S29). Whether the data corresponding to one page of the image is written or not is judged (S30), and if so, whether the printing section 2 is ready for printing or not is judged (S31). If so, the printing section 2 is driven to print the one-page image on the paper $P_2$ (S32). Whether the data of the next page has been transmitted or not is judged (S33), and if not, the temperature adjusting circuit is controlled to switch the set temperature of the fixing device 37 from the operating mode temperature to the waiting mode temperature (S34), and apparatus is put into the waiting mode (S35). In this way, the receiving operation is finished. If the data for the next page has been transmitted in S33, the operation goes back to S28 as shown in FIGS. 4A and 4B and the operation from S28 through S33 is repeated.

Since the set temperature of the fixing device 37 is switched to the operating mode temperature only after the microcomputer 40 judges the receiving operation is to be executed in this embodiment, printing operation is completed quickly and power consumption can be reduced.

In the above embodiment, the set temperature of the fixing device 37 is switched after the receiving of the DCS is confirmed. However, the above switching may be done at some other time, for example, immediately after a calling tone is detected in S21. It should be noted, however, the switching in an earlier stage is more effective when switching the temperature takes time, for example, when the waiting mode temperature and the operating mode temperature are quite different.

In the above embodiment, if the printing section 2 is not ready in S31, the operation waits until it is ready. Since it takes a while for the paper $P_2$ to reach the fixing device 37 even if the receiving operation is started immediately after the set temperature of the fixing device 37 is switched to the operating mode temperature, the above waiting period can be eliminated by starting the receiving operation first so that the temperature change may be completed before the paper $P_2$ reaches the fixing device 37.

A second embodiment according to this invention will be described hereinafter. The second embodiment is different from the first embodiment only in the following point, and so the identical construction and operation with the first embodiment will be omitted. The second embodiment has a construction in which the data demodulated by the demodulator 55 is stored in the buffer memory 56 until the amount of data reaches a certain level in the case of data receiving. In other words, the buffer memory 56 is given large enough a capacity to store the data corresponding to multiple pages of the document image. When the data is input to the buffer memory 56, whether the remaining capacity of the buffer memory 56 is less than a specified level or not is judged. If so, control of the printing section 2 is started to print the image on the paper $P_2$, and if not, more data is input to the buffer memory 56 without executing printing.

Instead of detecting the remaining capacity of the buffer memory 56, the amount of data stored in the buffer memory 56 may be detected.

Figure 6A:
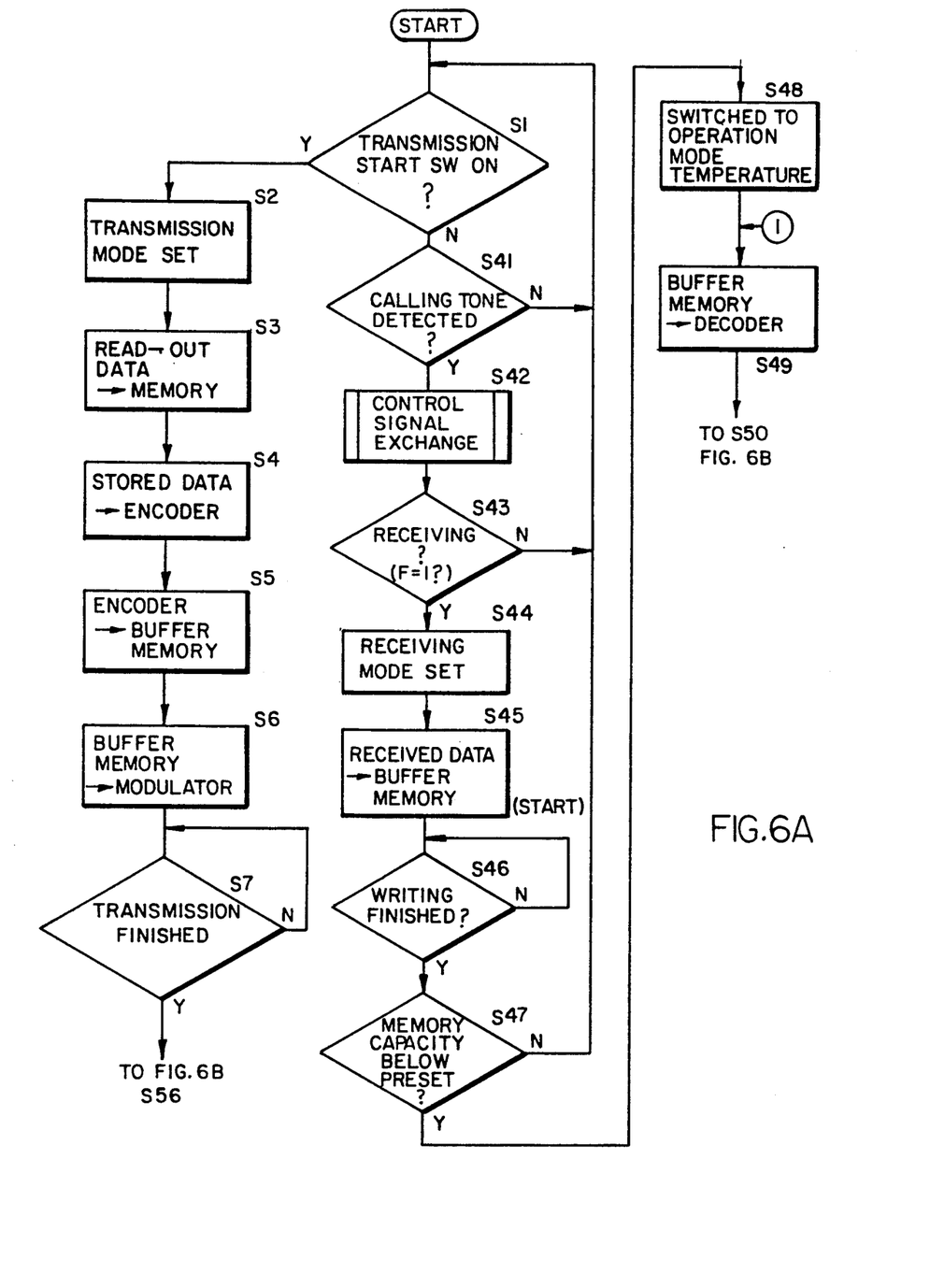
FIGS. 6A–B are flowcharts showing a main routine of a second embodiment according to this invention.
Figure 6B:
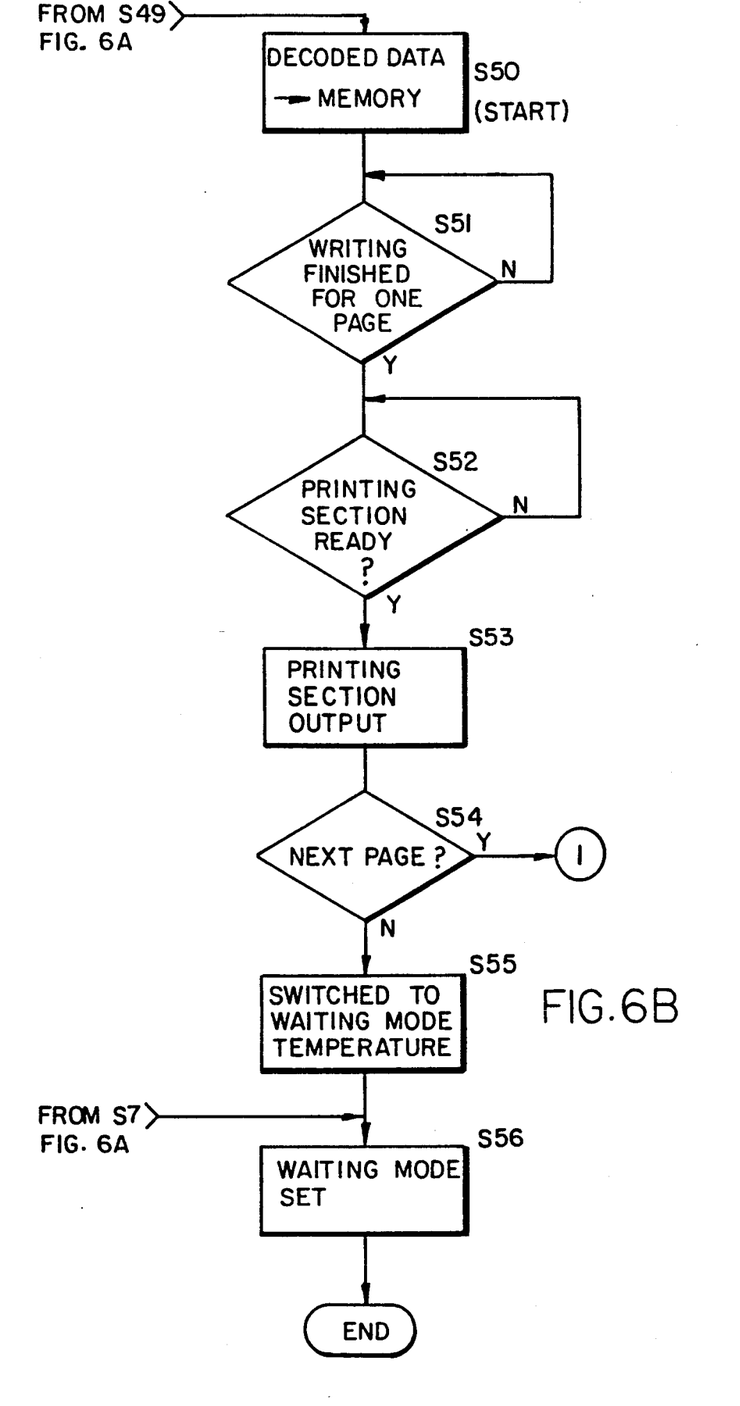

FIGS. 6A and 6B show the main routine of this embodiment. Since the transmission operation, which is executed when the transmission start switch is on in S1, is the same as that of the first embodiment, the explanation will be omitted.

If the transmission start switch is off in S1, the same operation as in S21 through S23 and S25 through S27 of the first embodiment is executed (S41 through S46). The temperature switching for the fixing device 37 is not done. When the data writing into the buffer memory 56 is completed, whether the remaining capacity of the buffer memory 56 is less than a preset reference level or not is judged (S47). If the remaining capacity is the same or above the reference level (for example, 20% of the total capacity), the operation goes back to S1 without switching the set temperature of the fixing device 37 (namely, without printing on the paper $P_2$) and still storing the data in the buffer memory 56, whereby to repeat the operation of S1 and S41 through S47 until the remaining capacity gets less than the reference level. When the capacity gets below the reference level, the temperature adjusting circuit is controlled to switch the set temperature of the fixing device 37 from the waiting mode temperature to the operating mode temperature (S48). After that, the same operation as in S28 through S35 of the first embodiment is repeated (S49 through S56).

According to this embodiment, since the data is printed collectively instead of page by page, the operation time of printing section 2 can be shortened and so power consumption can be reduced.

In the case of the second embodiment, the data is output to the printing section 2 after the remaining capacity of the buffer memory 56 is checked. Therefore, another construction is possible in which the fixing device 37 is off while the operation is waiting for the printing section 2 to get ready.

Although the temperature of the fixing device 37 is adjusted by turning on or off the fixing lamp 41 in the above embodiments, the adjustment may be in a different way.

So far, the operation executed when the addressee is to receive the data has been described. However, the addresser can receive the data by transmitting the DTC. In this case, the set temperature of the fixing device is switched to the operating mode temperature when some operation is executed to make the addresser receive the data, when it is determined that the addresser receive the data, or the like.

Although the present invention has been fully described by way of embodiments with references to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A facsimile apparatus for receiving a data transmitted through a line, the apparatus comprising:
means for storing a data transmitted from memory an addresser;
capacity detecting means for detecting an amount of data stored in said memory means;
image forming means for forming a toner image on a recording paper in accordance with the data;
thermal fixing means for fixing the toner image on the recording paper by heating; and
temperature controlling means for controlling said thermal fixing means to have an operating mode temperature which is high enough to fix the image on the recording paper in accordance with a detection result of said capacity detecting means.

2. A facsimile apparatus of claim 1, wherein said temperature controlling means controls said thermal fixing means to have either one of the operating mode temperature and a waiting mode temperature, which is lower than the operating mode temperature.

3. A facsimile apparatus of claim 1, wherein said temperature controlling means controls said thermal fixing means to have either one of a condition of having the operating mode temperature and another condition of being off.

4. A facsimile apparatus of claim 1, further comprising data controlling means for sending the data stored in said memory means to said image forming means for image forming when said temperature controlling means starts controlling said thermal fixing means to have the operating mode temperature.

5. A facsimile apparatus of claim 1, further comprising:
temperature detecting means for detecting a temperature of a fixing section of said thermal fixing means; and
data controlling means for sending the data stored in said memory means to said image forming means for image forming when said temperature detecting means detects said thermal fixing means has the operating mode temperature.

6. A facsimile apparatus of claim 2, wherein said temperature controlling means switches the temperature of said thermal fixing means from the operating mode temperature to the waiting mode temperature when there is no data left in said memory means and said thermal fixing means finishes fixing the image on the recording paper.

7. A facsimile apparatus of claim 3, wherein said temperature controlling means controls said thermal fixing means of the operating mode temperature to be off when there is no data left in said memory means and said fixing means finishes fixing the image on the recording paper.

8. A facsimile apparatus comprising:
memory means for storing a data transmitted from an addresser;
image forming means for forming a toner image on a recording paper in accordance with the data;
thermal fixing means for fixing the toner image on the recording paper by heating;
first controlling means for adjusting a temperature of said thermal fixing means; and
second controlling means for controlling said first controlling means in accordance with an amount of data stored in said memory means.

9. A facsimile apparatus comprising:
receiving means for receiving a data transmitted through a line;
image forming means for forming a toner image on a recording paper in accordance with the data;
thermal fixing means for fixing the toner image on the recording paper by heating;
detecting means for detecting an operating condition of said receiving means and outputting a signal corresponding to the receiving condition; and
temperature controlling means for controlling an operating condition of said thermal fixing means based on the signal from said detecting means.

10. A facsimile apparatus of claim 9, wherein said temperature controlling means controls said thermal fixing means to have either one of the operating mode temperature and a waiting mode temperature, which is lower than the operating mode temperature.

11. A facsimile apparatus of claim 9, wherein said temperature controlling means controls said thermal fixing means to have either one of a condition of having the operating mode temperature of another condition of being off.

12. A facsimile apparatus of claim 9, further comprising data controlling means for sending the data received by said receiving means to said image forming means for image forming when said thermal fixing means starts controlling said thermal fixing means to have the operating mode temperature.

13. A facsimile apparatus of claim 9, further comprising:
memory means for storing the data received by said receiving means;
temperature detecting means for detecting a temperature of a fixing section of said thermal fixing means; and
data controlling means for sending the data stored in said memory means to said image forming means for image forming when said temperature detecting means detects said thermal fixing means has the operating mode temperature.

14. A facsimile apparatus of claim 10, wherein said temperature controlling means maintains said thermal fixing means at the waiting mode temperature when said image forming means has no more data for image forming.

15. A facsimile apparatus of claim 11, wherein said temperature controlling means turns said thermal fixing means off when said image forming means has no more data for image forming.

16. A facsimile apparatus of claim 9, wherein said temperature controlling means starts controlling said thermal fixing means to have the operating mode temperature when said detecting means detects said receiving means receives a calling tone.

17. A facsimile apparatus of claim 9, wherein said temperature controlling means starts controlling said thermal fixing means to have the operating mode temperature when said detecting means detects said receiving means receives a signal with which that the apparatus is to receive the data is confirmed.

18. In a facsimile apparatus using electrophotography to form an image in accordance with a received data and to thermal-fix the image on a recording paper, an image forming method comprising the steps of:

maintaining thermal fixing means at a first temperature;

receiving a signal with which that the apparatus is to receive the data is confirmed;

switching the temperature of the thermal fixing means from the first temperature to a second temperature; and starting image forming.

19. A method of claim 18, further comprising the step of switching the temperature of the thermal fixing means from the second temperature back to the first temperature after image forming.

20. In a facsimile apparatus for using electrophotography to form an image in accordance with a received data and to thermal-fix the image on a recording paper, an image forming method comprising the steps of:

storing a received data in a memory;

detecting an amount of data stored in the memory;

setting thermal fixing means at an operating mode temperature when the amount of data stored in the memory is above a specified level; and sending the data stored in the memory to an image forming section when the thermal fixing means obtains the operating temperature.

* * * * *

UNITED STATES PATENT AND TRADEMARK OFFICE
CERTIFICATE OF CORRECTION

PATENT NO. : 5,063,459

DATED : November 5, 1991

INVENTOR(S) : Munehiro Nakatani, et al.

It is certified that error appears in the above-identified patent and that said Letters Patent is hereby corrected as shown below:

In col. 2, line 26, after "printing", insert --section--.

In col. 2, line 30, after "signal", insert --exchange--.

In col. 4, line 24, change "one-age" to --one-page--.

In col. 7, line 27 (claim 1, line 3), before "means", insert --memory--.

In col. 7, line 27 (claim 1, line 3), after "from", delete "memory".

Signed and Sealed this

Ninth Day of March, 1993

Attest:

STEPHEN G. KUNIN

Attesting Officer

Acting Commissioner of Patents and Trademarks